Figure 1:
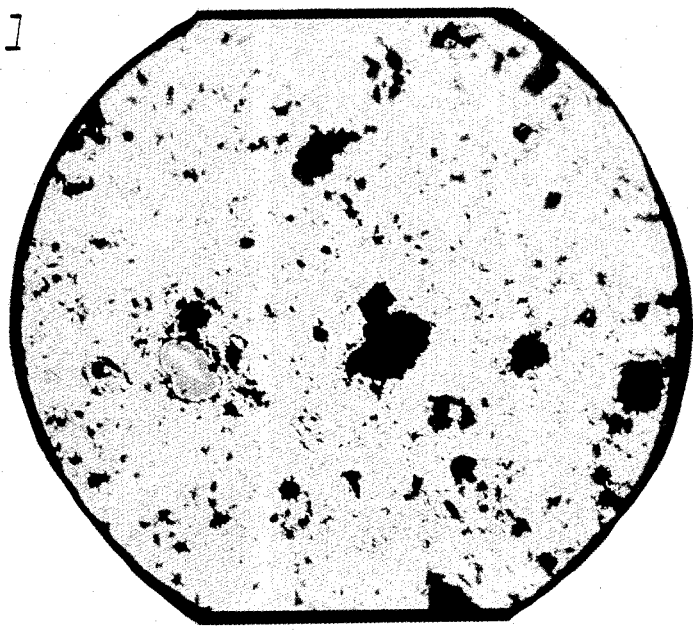

Sept. 10, 1957        J. H. HANDWERK ET AL        2,805,473
URANIUM-OXIDE-CONTAINING FUEL ELEMENT
COMPOSITION AND METHOD OF MAKING SAME Filed Sept. 6, 1956                                2 Sheets-Sheet 1

INVENTORS
Joseph H. Handwerk
Robert A. Noland
David E. Walker

By: Roland A. Anderson
Attorney

INVENTORS
Joseph H. Handwerk
Robert A. Noland
David E. Walker

By: Roland A. Anderson
Attorney

United States Patent Office
2,805,473
Patented Sept. 10, 1957

2,805,473

URANIUM-OXIDE-CONTAINING FUEL ELEMENT COMPOSITION AND METHOD OF MAKING SAME

Joseph H. Handwerk, Joliet, Robert A. Noland, Chicago, and David E. Walker, Park Forest, Ill., assignors to the United States of America as represented by the United States Atomic Energy Commission Application September 6, 1956, Serial No. 608,414

10 Claims. (Cl. 29—182.5)

This invention deals with a composition of matter to be used for fuel elements of nuclear reactors and with a method of making the fuel elements. The fuel material of this invention is suitable, for instance, for fuel elements such as are disclosed in application Serial No. 236,644, filed by Henry Hurwitz, Jr. et al. on July 13, 1951, now Patent No. 2,799,642, granted July 16, 1957, or for fuel elements of the type described in the article "The Swimming Pool Reactor and Its Modifications," by W. M. Breazal, R. G. Cochran and K. O. Donelian, in Proceedings of the International Conference on the Peaceful Uses of Atomic Energy, United Nations, New York, 1956, vol. 2, pages 420–427, or in the book "Reference Material on Atomic Energy," United States Atomic Energy Commission, August 1955, vol. 1, pages 125–127.

For some types of reactors bodies formed of or containing a mixture of uranium dioxide and aluminum powder have been used in fuel elements. However, these mixtures were found not to be suitable when exposed to higher temperatures, for instance, to about 600° C., because after some time at such high temperatures, distortion of the fuel elements occured which made their removal from the reactor difficult and often even impossible. Examination of these distorted fuel elements by X-ray diffraction showed that the uranium dioxide had been reduced by the aluminum powder and that an alloy of the composition $UAl_4$ had been formed; the formation of this alloy was found to be responsible for the distortion and also for a reduced mechanical strength.

It is an object of this invention to provide a fissionable material for fuel elements which does not become distorted when exposed to elevated temperatures.

It is also an object of this invention to provide a fissionable material for fuel elements of nuclear reactors which is chemically nonreactive with water so that cladding or jacketing is not necessary when these elements are used in low-power, low-temperature, water-cooled reactors.

It has been found that if uranosic oxide, $U_3O_8$, is substituted for uranium dioxide, $UO_2$, in the compositions used heretofore, the mechanical properties are not impaired when these materials are used in fuel elements at reactor temperatures, for instance, at about 600° C., and also that no distortion takes place.

Fuel elements made of uranosic oxide and aluminum powder according to this invention, after neutron bombardment at elevated temperatures, were examined by X-ray diffraction; no formation of a uranium-aluminum alloy was ascertained; the uranium phase was found to consist of a mixture of $UO_2$ and $U_3O_8$. It is believed that in the fuel elements based on this invention, the aluminum reduces the uranosic oxide to uranium dioxide and the aluminum thereby oxidizes to aluminum oxide which forms a surface film on the particles so that the uranium oxides are separated from the aluminum metal and a further reaction of the aluminum with the uranium oxides cannot take place. Fuel elements made from the compound of this invention were found not to become distorted when irradiated in a nuclear reactor. It therefore appears that the uranium-aluminum alloy, $UAl_4$, absent from the composition of this invention, is responsible for the impairment of the mechanical properties in the fuel elements used heretofore.

The concept of this invention is applicable to metals other than aluminum; for instance, fuel elements can be made from a mixture of magnesium metal and uranosic oxide alone or in mixture with magnesium oxide.

In preparing the fuel elements of this invention, the uranosic oxide and aluminum, both in powder form, are first mixed, preferably in a ball mill. The $U_3O_8$-content of the mixture can be as high as 60% by weight, and the uranium of the oxide can either be natural uranium or uranium enriched in $U^{235}$.

After a homogeneous mixture has been obtained in the ball mill, it is shaped into fuel elements. While various methods known to the art may be used for this purpose, extrusion at elevated temperature was found to be the most satisfactory method. Temperatures between about 425 and 485° C., preferably of 485° C., were found suitable in the case of aluminum and the range between about 315 and 415° C. for the magnesium-containing mixture.

If the fuel elements are to be used in the reactor at elevated temperature, they are advantageously enclosed in a corrosion-resistant metal, such as aluminum. In this case the powder is poured into a "can," and the can with the content is then subjected to the extrusion step. The use of a bonding material was not necessary. The ends of the canned, extruded element can either be left uncovered, or a metal plate can be applied thereto, preferably by roll-bonding. In order to correct dimensional inaccuracies, the finished elements, whether canned or uncanned, can be subjected to a subsequent step of cold-rolling. This step of cold-rolling is optional.

In order to reduce contamination of the cooling water in the reactor by fission products that are formed and contained in the uranosic oxide of the surface layers of the fuel element, it was found advantageous to pickle the surface with an acid, for instance, with nitric acid, whereby any uranium-containing particles occluded in the surface layer are dissolved and removed whereby the formation of radioactivity in the surface layer is reduced.

The attached drawings contain four photomicrographs which show the improvement obtained by the invention.

Figure 2:
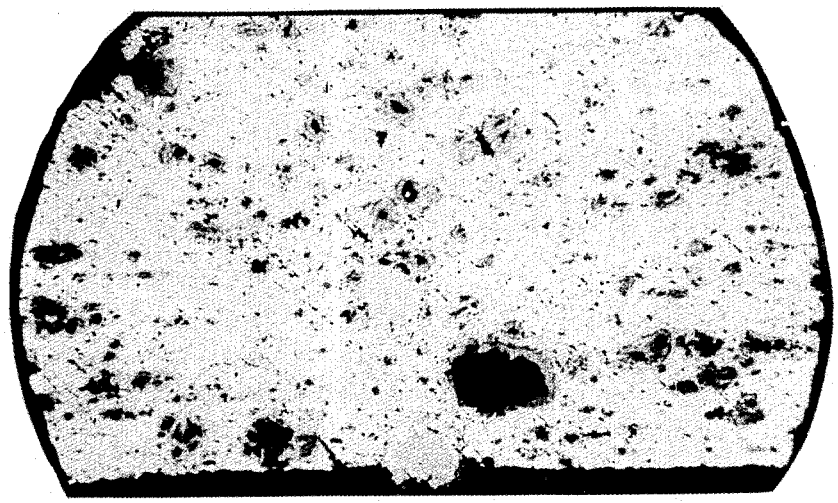

Figures 1 and 2 illustrate samples of aluminum-canned extruded elements (magnified 500-fold). Canning had been carried out by placing a mixture of aluminum and uranium dioxide powders (25% by weight of uranium dioxide and the remainder substantially being aluminum) into the can and evacuating the can within five hours to approximately 300 microns while a temperature of 550° C. was maintained. The can was then sealed, and the sealed can was maintained at 550° C. for another 16 hours. The canned unit was then extruded at 510° C. and subsequently hot-rolled for one hour at 600° C. whereby the thickness was reduced six-fold.

Figure 1 shows a uniform distribution of the uranium dioxide particles in the aluminum. Figure 2 shows a sample of another fuel element prepared and treated under conditions identical with those used in preparing the sample for Figure 1 with the exception that it had been heat-treated, after hot-rolling, at 660° C. under vacuum for 18 hours. Figure 2 clearly shows the changes that have taken place during this heat treatment. The small, dark particles have disappeared which is due to the formation of a uranium-aluminum alloy. Larger uranium dioxide particles, for instance that in the lower part to the right of the center of the photomicrograph, show the alloying reaction at the periphery by the light-colored edge.

Figure 3:
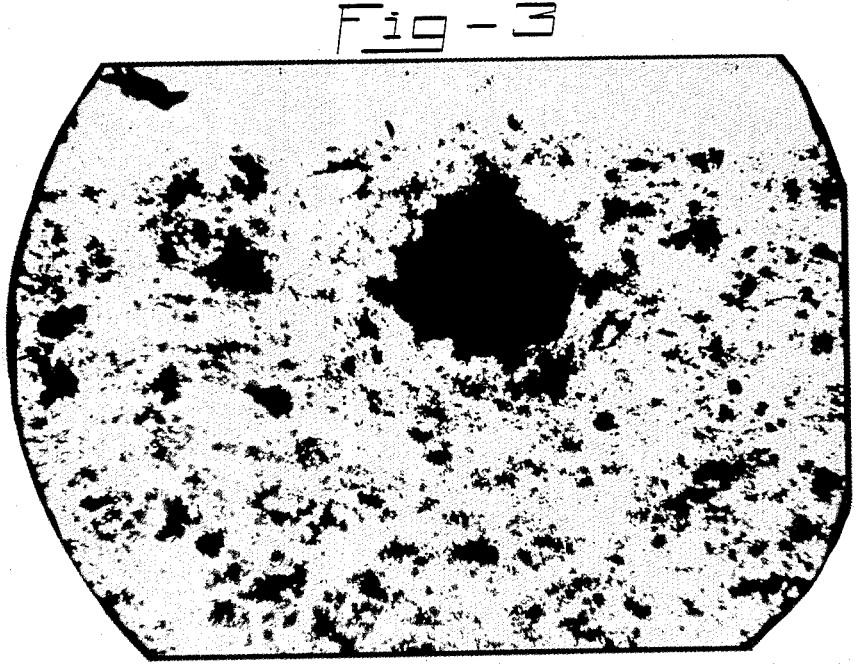
Figure 4:
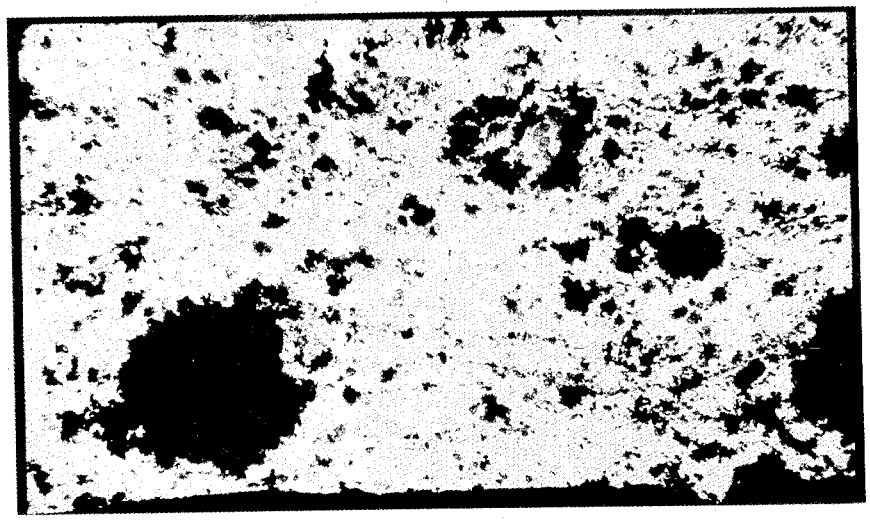

A similar set of two comparative experiments was carried out using the same operating conditions as those for Figures 1 and 2 but $U_3O_8$ instead of $UO_2$. The $U_3O_8$-content of these mixtures was 50% by weight. Figures 3 and 4 show the samples in 250-fold enlargement, Figure 3 as extruded and hot-rolled and Figure 4 after heat treatment of the extruded, hot-rolled fuel element. Both figures show the same, uniform dispersion of dark $U_3O_8$-$UO_2$ particles ($U_3O_8$ as well as $UO_2$ appear as dark particles), which indicates that no reduction to metallic uranium and no alloying have taken place.

It will be understood that this invention is not to be limited to the details given herein but that it may be modified within the scope of the appended claims.

What we claim is:

1. As a new composition of matter, a metal selected from the group consisting of aluminum and magnesium in a continuous phase, particles of uranosic oxide uniformly dispersed and embedded in said metal, said particles having a surface layer of uranium dioxide and said metal having a layer of the oxide of said metal at the interface with said particles.

2. The composition of matter of claim 1 in which the content of the uranium dioxide-coated uranosic oxide ranges up to 60% by weight.

3. The composition of matter of claim 1 in which the uranium oxides are enriched in $U^{235}$.

4. The composition of matter of claim 1 in which the metal is aluminum.

5. The composition of matter of claim 1 in which the metal is magnesium.

6. A method of making fuel elements comprising mixing powder particles of a metal selected from the group consisting of aluminum and magnesium with powder particles of uranosic oxide; shaping the mixture at elevated temperature under pressure whereby said metal reduces uranosic oxide on the surface layer of said particles to uranium dioxide, oxide of said metal is formed on the surface layer of said metal particles and said metal oxide-covered metal particles and said uranium dioxide-covered particles of uranosic oxide are integrally bonded together.

7. The process of claim 6 wherein said metal is aluminum and shaping is carried out by extrusion at a temperature of between 425 and 485° C.

8. The process of claim 6 wherein said metal is magnesium and shaping is carried out by extrusion at a temperature of between 315 and 415° C.

9. The process of claim 6 wherein the shaped fuel elements are pickled in an acid whereby any uranium-containing particles present on the surface are dissolved and removed.

10. The process of claim 9 wherein the acid is nitric acid.

No references cited.